(12) United States Patent  
Cervenka et al.

(10) Patent No.: US 7,345,396 B2
(45) Date of Patent: Mar. 18, 2008

(54) METALLIC LAMINATIONS FOR MAGNETIC CIRCUITS

(75) Inventors: Greg P. Cervenka, Houston, TX (US); Forrest M. Martino, Houston, TX (US)

(73) Assignee: National-Oilwell, L.P., Houston, TX (US)

( * ) Notice: Subject to any disclaimer, the term of this patent is extended or adjusted under 35 U.S.C. 154(b) by 0 days.

(21) Appl. No.: 11/085,379

(22) Filed: Mar. 21, 2005

(65) Prior Publication Data

US 2005/0253475 A1    Nov. 17, 2005

Related U.S. Application Data

(60) Provisional application No. 60/571,181, filed on May 14, 2004.

(51) Int. Cl.
*H02K 1/00* (2006.01)
*H02K 13/00* (2006.01)

(52) U.S. Cl. .............. 310/216; 310/259; 310/231; 310/269; 29/596; 29/598

(58) Field of Classification Search .............. 310/216, 310/64, 269; 29/598
See application file for complete search history.

(56) References Cited

U.S. PATENT DOCUMENTS

| | | | | |
|---|---|---|---|---|
| 2,655,613 | A | * | 10/1953 | Wieseman ............... 310/194 |
| 3,062,979 | A | * | 11/1962 | Jarret et al. ............. 310/168 |
| 4,141,137 | A | * | 2/1979 | De Wolf et al. ........... 29/596 |
| 5,051,634 | A | * | 9/1991 | Overton .................. 310/64 |
| 5,420,471 | A | * | 5/1995 | Yun ...................... 310/216 |
| 5,894,182 | A | * | 4/1999 | Saban et al. ............. 310/217 |
| 5,986,377 | A | * | 11/1999 | Yamada et al. .......... 310/216 |
| 6,674,187 | B2 | * | 1/2004 | Isozaki et al. ........... 310/49 R |
| 6,720,686 | B1 | * | 4/2004 | Horst .................... 310/51 |
| 6,794,884 | B2 | * | 9/2004 | Kliman et al. ........... 324/545 |
| 6,870,295 | B2 | * | 3/2005 | Lim et al. ............... 310/216 |
| 2002/0057032 | A1 | * | 5/2002 | Thiele et al. ............ 310/216 |
| 2004/0021392 | A1 | * | 2/2004 | LaBrush ................. 310/216 |
| 2004/0095035 | A1 | * | 5/2004 | Sogabe et al. ........... 310/216 |

FOREIGN PATENT DOCUMENTS

| | | | | |
|---|---|---|---|---|
| GB | 2315607 | A | * | 2/1998 |
| JP | 2000060037 | A | * | 2/2000 |
| JP | 2000341913 | A | * | 12/2000 |

* cited by examiner

*Primary Examiner*—Burton Mullins
*Assistant Examiner*—Erik Preston
(74) *Attorney, Agent, or Firm*—Mark E. Scott; Conley Rose, P.C.

(57) ABSTRACT

Metallic laminations for magnetic circuits. Some of the illustrative embodiments may be a magnetic circuit comprising a low reluctance magnetic flux path comprising a plurality of stacked metallic laminations (each lamination having an edge), and an air gap in operational relationship to at least a portion of the edges of the stacked metallic laminations (wherein magnetic flux flows at least partially through the stacked metallic laminations and the air gap). Adjacent edges of the stacked metallic laminations are intentionally offset by an amount greater than manufacturing tolerance of edge position for the stacked metallic laminations to improve eddy current loss occurring from lamination-to-lamination contact at the edges.

11 Claims, 4 Drawing Sheets

METALLIC LAMINATIONS FOR MAGNETIC CIRCUITS

CROSS-REFERENCE TO RELATED APPLICATIONS

This application claims the benefit of provisional application Ser. No. 60/571,181, filed May 14, 2004, entitled, "Metallic laminations for magnetic circuits," which application is incorporated herein by reference as if reproduced in full below.

STATEMENT REGARDING FEDERALLY SPONSORED RESEARCH OR DEVELOPMENT

Not applicable.

BACKGROUND OF THE INVENTION

1. Field of the Invention

The embodiments of the invention are directed to reducing core loss and stray load loss in magnetic circuits comprising laminated metallic cores with air gaps between them. More particularly, at least some embodiments of the invention are directed to systems that reduce losses caused by eddy currents in shorted metallic laminations of magnetic circuits.

2. Description of the Related Art

Electric motors, and other devices comprising magnetic circuits where magnetic flux crosses an air gap, utilize stacked metallic laminations as part of the low reluctance path for magnetic flux created by electrical current flow. Metal is used for its low reluctance (resistance to magnetic flux flow) properties, and stacked laminations are used to reduce eddy current losses.

FIG. 1 illustrates the stacked laminations of a stator of an electric motor of the related art. In particular, the stator 10 comprises a plurality of laminations 12 (only some of which are numbered in FIG. 1). Each lamination comprises two or more teeth 14 which define a slot 16 between them. Windings (e.g., copper wiring or bars) are placed within the slots, and teeth 14 form a part of the low reluctance path for the magnetic flux through the stator 10.

Likewise, FIG. 2 illustrates a rotor 20 of an electrical motor of the related art comprising a plurality of stacked laminations 22 (only some of which are numbered in FIG. 2). Each lamination 22 comprises one or more teeth 24 that define a slot 26 between them. Windings (e.g., copper wiring or bars) are placed within the slots 26, and teeth 24 form a part of the low reluctance path for the magnetic flux through the rotor 20.

The rotor 20 of FIG. 2, its main rotational shaft (not shown), and windings (not shown), are placed within the illustrative stator 10 of FIG. 1, and the interactions of the electric and magnetic fields produce rotation when the overall assembly is used as a motor, and produce power if the assembly is used as a generator.

Inasmuch as the rotor 20 turns within the stator 10, the laminations 12 of the stator preferably do not touch the laminations 22 of the rotor 20. Thus, there exists an air gap between the rotor 20 and the stator 10 that the magnetic flux crosses to complete the magnetic circuit. FIG. 3, taken substantially along line 3-3 of FIG. 1, illustrates the relationship of two teeth of the stacked laminations with the upper portion of the teeth bordering the air gap. In particular, a first tooth 30 may comprise a metallic portion 32, along with an insulating layers 34 disposed on each side of the metallic portion 32. Likewise, tooth 36 may comprise a metallic portion 38 surrounded by insulating layers 40. The insulating layers 34 and 40 are used to electrically isolate the laminations to reduce the occurrence of eddy currents in the lamination.

The laminations themselves are made on an individual basis, possibly by stamping the laminations from a larger sheet of material, or by laser cutting the laminations from the larger sheet of material. Regardless of the mechanism by which an individual lamination (e.g., 12 or 22) is made, there is a tendency in the stamping and/or cutting process to create a barb or burr at the edges of each lamination. Referring again to FIG. 3, tooth 30 is shown to have a burr 42 which could be caused, for example, by a die stamping (in the direction indicated by arrow 44) a larger sheet of material to produce the individual lamination. Likewise, tooth 36 illustrates a burr 46 created during its construction. The insulating layers 34 and 40 are added prior to creation of the individual lamination, and therefore stamping or cutting to create a lamination electrically exposes ends of the teeth, for example end 48. In the process of stacking the individual laminations to form the stator and/or rotor, the burrs (e.g., 42 and 46) tend to physically touch the uninsulated area of the adjacent tooth. This creates an electrical conduction path that spans two or more teeth, which thereby increases the eddy current path length and the power loss associated with the eddy currents.

There have been attempts in the related art to reduce the electrical shorting caused by the burrs contacting electrically exposed areas, but these attempts significantly increase manufacturing costs. For example, one related art method is to remove the burrs from each individual lamination after its creation. A second related method is to flame treat the laminations, either individually or after their stacking, in an attempt to burn away the burr material. Yet another related art method is to mill the laminations slightly after staking, also known as a skin cut.

Thus, what is needed in the art is a method and related system to reduce the effects the burrs on each lamination may have without unduly complicating or adding expense to the motor manufacturing process.

SUMMARY OF SOME OF THE PREFERRED EMBODIMENTS

The problems noted above are solved in large part by a method and related system of laminations for magnetic circuits. Some of the illustrative embodiments may be a magnetic circuit comprising a low reluctance magnetic flux path comprising a plurality of stacked metallic laminations, (each lamination having an edge), and an air gap in operational relationship to at least a portion of the edges of the stacked metallic laminations (wherein magnetic flux flows at least partially through the stacked metallic laminations and the air gap). Adjacent edges of the stacked metallic laminations are offset by an amount greater than manufacturing tolerance of edge position for the stacked metallic laminations.

Other illustrative embodiments may be a stator of an electric motor comprising a plurality of metallic laminations, each lamination comprising a plurality of teeth projecting inward, and said plurality of metallic laminations stacked such that their teeth align to form a plurality of ridges, with slots between the ridges. Tooth lengths of teeth in a first ridge alternate between a long tooth length and a short tooth length, the long tooth length at least approximately 10 thousandths of an inch (thousandths) or more longer than a short tooth length.

Still further illustrative embodiments may be a rotor of an electric motor comprising a plurality of metallic lamination (each lamination comprising a plurality of teeth projecting outward), and the plurality of metallic lamination stacked such that their teeth align to form a plurality of ridges (with slots between the ridges). Tooth lengths in a first ridge alternate between a long tooth length and a short tooth length, the long tooth length at least approximately 10 thousandths of an inch (thousandths) or more longer than the short tooth length.

Still further embodiments may comprise a metallic lamination forming at least a part of a magnetic circuit, the magnetic lamination comprising an upper surface defining a first plane, a lower surface defining a second plane (and wherein the first and second planes are substantially parallel), at least one of the upper surface or lower surface coated with an insulating material, a plurality of projections projecting substantially parallel to the first and second plane (each projection having a proximal end disposed on a circumference of a substantially circular region of the metallic lamination, and each projection further having a distal end), and each projection having a length measured from its proximal end to its distal end. Lengths of the projections alternate between long and short along the circumference.

Yet still other embodiments may be an electric motor comprising a stator and a rotor. The stator comprises a first and second metallic laminations, each lamination comprising a plurality of teeth projecting inward, and said first and second metallic laminations stacked such that their teeth align to form a plurality of ridges, with slots between the ridges. A length of a tooth of a first metallic lamination is longer by at least a manufacturing tolerance for length of the each tooth than a length of a tooth of the second metallic lamination, the teeth in the same ridge.

Yet still other embodiments may be an electric motor comprising a stator and a rotor, the rotor comprising a first and second metallic laminations, each lamination comprising a plurality of teeth projecting outward, and said first and second metallic laminations stacked such that their teeth align to form a plurality of ridges, with slots between the ridges. A length of a tooth of a first metallic lamination is longer by at least a manufacturing tolerance for length of the each tooth than a length of a tooth of the second metallic lamination, the teeth in the same ridge.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "connect" or "connects" is intended to mean either an indirect or direct connection. Thus, if a first device connects to a second device, that connection may be through a direct connection, or through an indirect connection via other devices.

DETAILED DESCRIPTION OF THE PREFERRED EMBODIMENTS

The various embodiments of the invention are directed to methods and related systems of reducing the occurrence of electrical shorts between adjacent components of magnetic circuits, such as stacked laminations in any system where laminations are used in conjunction with an air gap as the path of flow of magnetic flux. Reducing shorts reduces eddy current conduction paths, which decreases core loss in any magnetic circuit, but is of particular value in motors fed by variable frequency drives. Moreover, lower eddy current losses, and other core losses, enables motor designers to reduce the air gap between the rotor and stator, which increases power factor. The term "core loss" should not be construed to be only a no-load condition. The various embodiments of the invention improve eddy current losses occurring both at no-load and under loaded conditions. Further, the various embodiments were developed in the context of electrical motors, and will be explained in that context; however, the explanation with respect to electrical motors should not be construed as limiting the applicability of the invention only to electrical motors.

Figure 4:
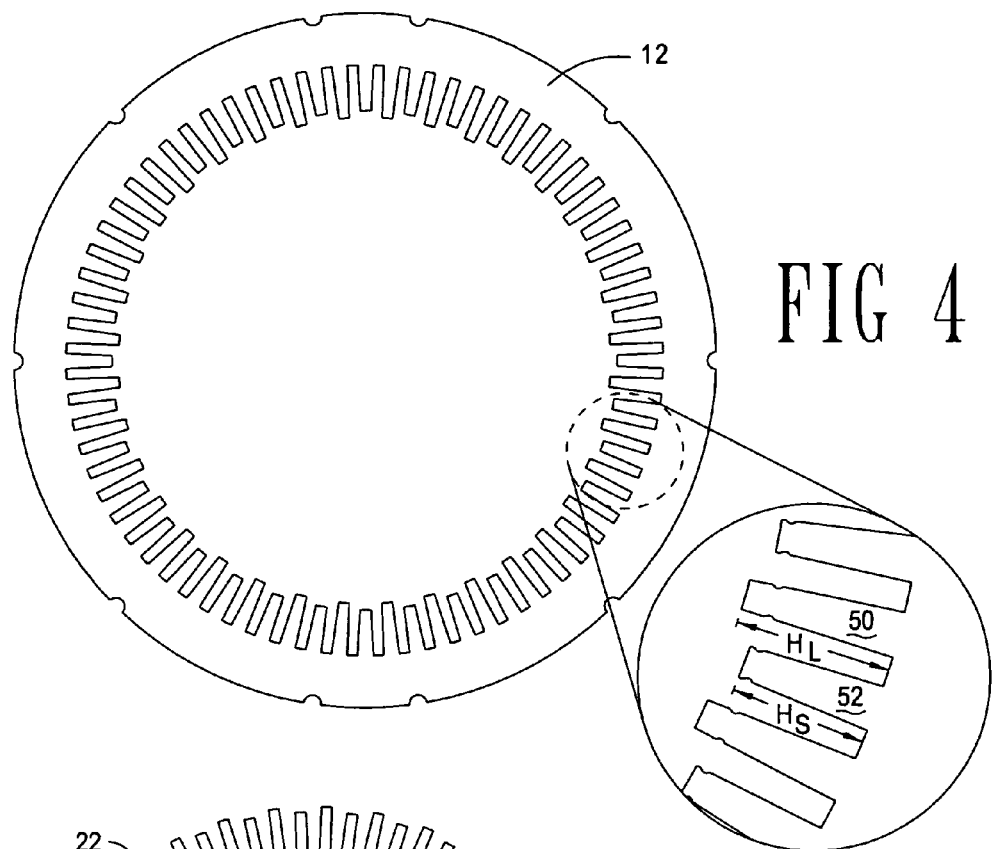
FIG. 4 illustrates a single stator lamination constructed in accordance with embodiments of the invention.

FIG. 4 illustrates a single stator lamination 12 constructed in accordance with embodiments of the invention. The lamination 12 comprises a plurality of projections or teeth, each tooth having a proximal end disposed on a circumference of a circular region of the lamination, and a distal end pointing inward. Unlike related art laminations where each tooth has substantially the same length or height, in accordance with embodiments of the invention, and as shown in the magnified region, tooth height (labeled H in the figure) alternates between a long tooth height $H_L$ and a short tooth height $H_S$. For example, projection or tooth 50 is illustrated to be longer than tooth 52. In this specification and in the claims, height of the teeth may be equivalently referred to as length.

Figure 5:
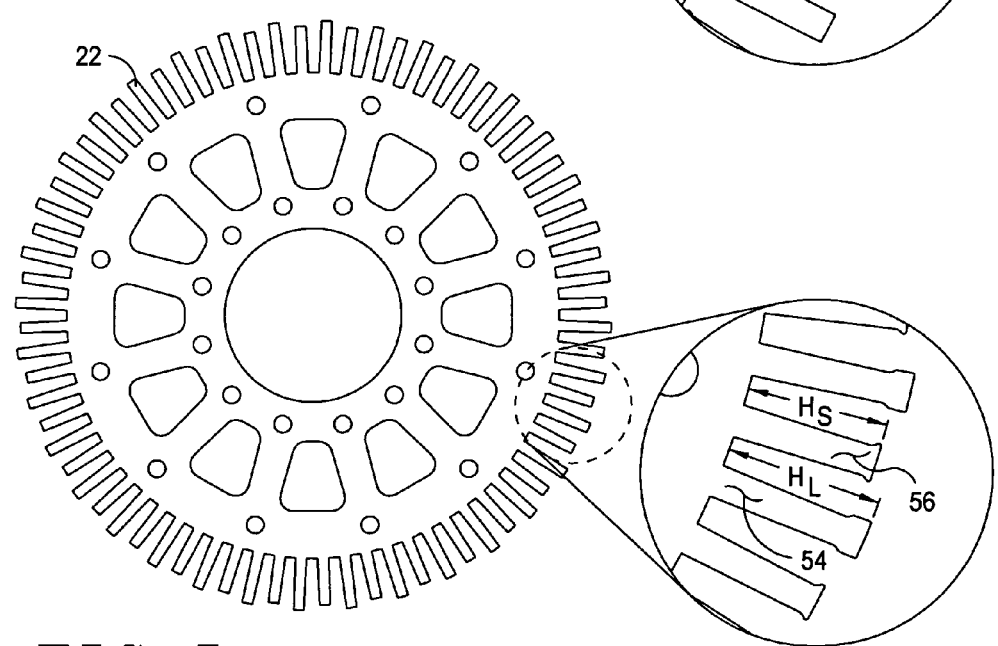
FIG. 5 illustrates a single rotor lamination constructed in accordance with embodiments of the invention.

FIG. 5 illustrates a single rotor lamination 22 constructed in accordance with embodiments of the invention, likewise showing the relationship of the tooth height in the magnified region. The lamination 22 comprises a plurality of teeth, each tooth having a proximal end disposed on a circumference of a circular region of the lamination; and a distal end pointing outward. Like the stator lamination, tooth heights of the rotor lamination alternate between a long tooth height $H_L$ and a short tooth height $H_S$. For example, rotor tooth 54 is illustrated to be longer than tooth 56.

Figure 1:
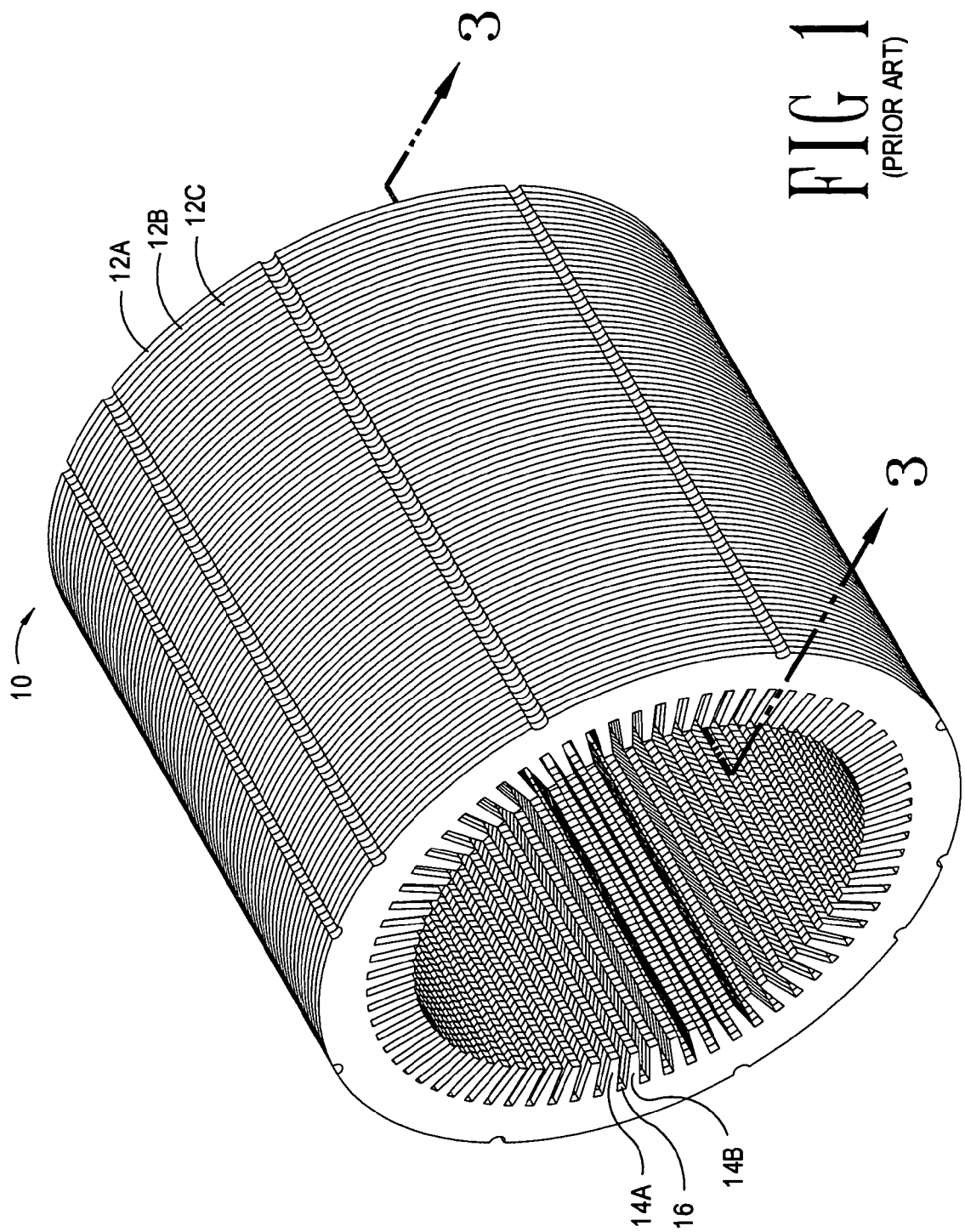
FIG. 1 illustrates a portion of a stator of an electric motor.
Figure 2:
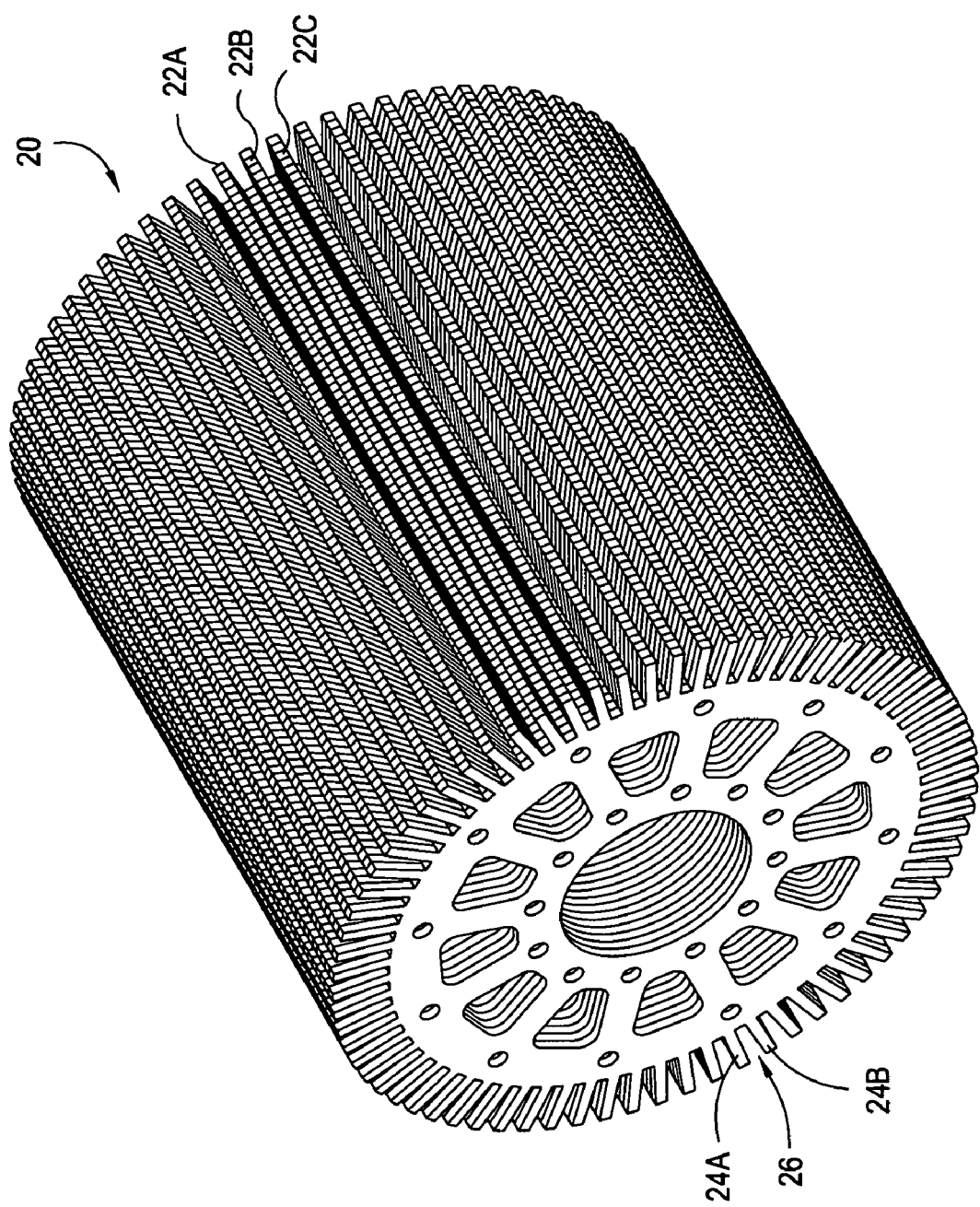
FIG. 2 illustrates a portion of a rotor of an electric motor.
Figure 3:
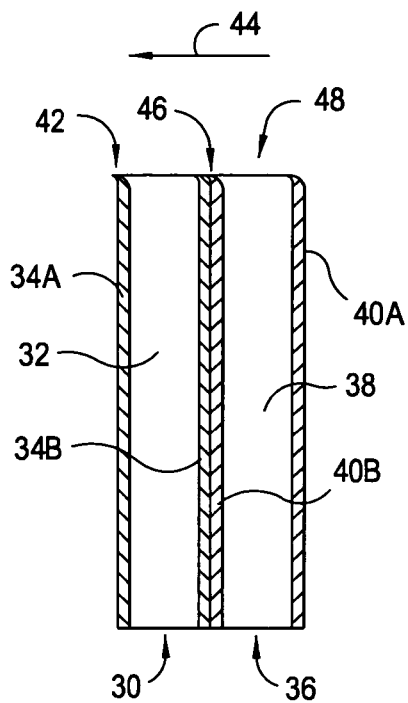
FIG. 3 illustrates the relationship of teeth of the stator of FIG. 1 taken substantially along line 3-3 of FIG. 1.
Figure 6:
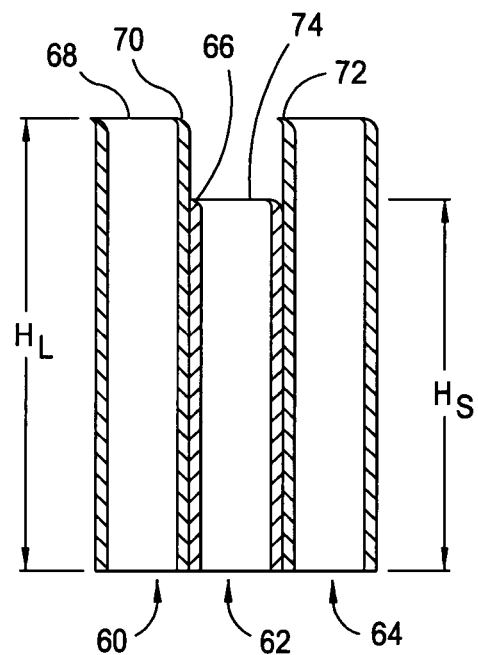
FIG. 6 illustrates the relationship of teeth of a stacked lamination stator and/or rotor in accordance with embodiments of the invention.

Stacking the laminations in accordance with embodiments of the invention involves positioning the laminations such that the teeth from a plurality of laminations form a row or ridge, and such that the tooth height within a ridge alternates between the long tooth height $H_L$ and the short tooth height $H_S$. FIG. 6 illustrates the relationship of plurality of teeth of either a stator or rotor in a view similar to that of FIG. 3. In particular, tooth 60 is illustrative of long tooth having a height $H_L$, tooth 62 is illustrative of a short tooth having a height $H_S$, and finally tooth 64 is illustrative again of the long tooth. Because of the differences in tooth height, the burr 66 of the tooth 62 is below the electrically exposed surface 68 of tooth 60, and instead contacts the insulating material 70. Likewise, the burr 72 of tooth 64 is well above the electrically exposed surface 74 of tooth 62. Thus, because of the alternating heights of the teeth, the likelihood of the burr of one tooth electrically contacting the electrically exposed surface of an adjacent tooth eliminated.

The differences in height of the teeth in FIGS. 4, 5 and 6 is exaggerated to illustrate the concepts of the invention. In operation, the difference in tooth height between a long tooth and short tooth should be sufficiently large to separate the burr from the exposed electrical surface, preferably by an amount greater than the manufacturing tolerance of the laminations to ensure the differences in height. In accordance with embodiments of the invention where manufacturing tolerances on the order of ±5 thousandths of inch (hereinafter just thousandths), the difference in tooth height may be between 10 thousandths and 30 thousandths, with 10 thousandths preferred. The difference in tooth height is thus a full two orders of magnitude larger than the illustrative manufacturing tolerance for tooth height. Other tooth heights may be used based on changes in manufacturing tolerance.

Figure 7:
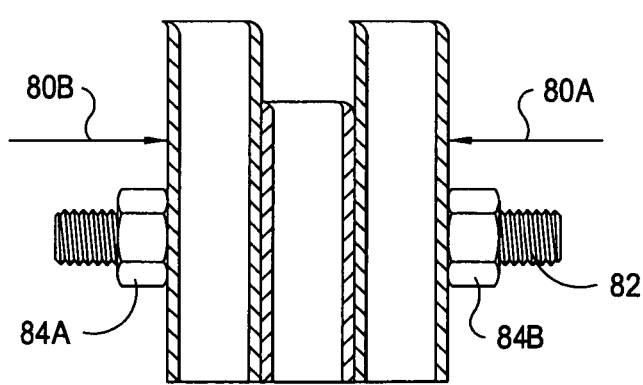
FIG. 7 illustrates the relationship of teeth of a stator and/or rotor under compressive force in accordance with embodiments of the invention.

After stacking the individual laminations (whether rotor or stator), the assembly is placed under a compressive force to hold the laminations in place during operation. Not only do the laminations need to be sufficiently immobile to avoid movement induced by the electric and magnetic fields, but in the case of the rotor the laminations should be sufficiently immobile to overcome movement resulting from by acceleration, deceleration, rotation and/or magnetic forces. FIG. 7 illustrates a plurality of teeth of a lamination placed under a compressive force, illustrated by arrow 80, possibly by the force of a bolt 82 and corresponding nuts 84. In the related art, the compressive force applied to a lamination is strictly controlled to be between 100 and 150 pounds per square inch (PSI). The related art compressive force is chosen to reduce the likelihood of the burrs of the laminations contacting the electrically exposed areas of adjacent teeth—the lower the compressive force applied, the lower the chances that the burrs will contact adjacent electrically exposed areas. The related art compressive force may also be dictated by the fact that the greater the compressive force, the lower the resistance between lamination where a short has taken place.

While compressing the improved rotor and stator laminations described above with compressive forces on the order 100 to 150 PSI is within the contemplation of the invention, because of the alternating height of the teeth it is possible to increase the compressive force applied to laminations, possibly increasing the number of laminations that make up that portion of the magnetic flux path, thus increasing efficiency. In accordance with at least some embodiments of the invention, the compressive force applied to hold together a plurality of laminations may be greater than 150 PSI, and in some embodiments 200 PSI or greater. Referring again to FIG. 6, the burr 66 of short tooth 62 contacts the insulating material 70 of the adjacent tooth 60. The compressive force applied to the lamination in some embodiments is selected to be below a compressive force where the burr penetrates the insulating material and electrically contacts the tooth 60.

In accordance with still further embodiments of the invention, the compressive force applied to the laminations is increased beyond the point where a burr may penetrate the insulating material of an adjacent tooth and electrically contact the underlying metallic material. While the penetration may result in a larger eddy current path, eddy currents diminish in strength proportional to distance from the air gap, and thus efficiency loss caused by the larger eddy current path away from the air gap is not as significant as would be experienced closer to the air gap.

The above discussion is meant to be illustrative of the principles and various embodiments of the present invention. Numerous variations and modifications will become apparent to those skilled in the art once the above disclosure is fully appreciated. For example, the embodiments discussed above utilize alternating tooth heights on each individual lamination to achieve the alternation in the rotor or stator. To ensure alternation of tooth height, each individual lamination may either be rotated within a plane prior to stacking, or each individual lamination may be turned over prior to stacking. However, it is within the contemplation of the invention that two types of laminations may be used: a first type having all long teeth; and a second type having all short teeth. The alternating tooth height in the final assembly may thus be accomplished by alternating lamination type during the stacking process. Moreover, having offsets could also be accomplished by offsetting the laminations themselves, such as by offsetting salient pole laminations. In particular, placing the lamination slightly unsymmetrical about the centerline of the pole produces a rotor surface with alternating heights at the surface. Further still, rotors and stators using the above described technology need not be used in combination. Significant gains may be achieved having only a stator or only a rotor constructed as described, such as in permanent magnet machines. It is intended that the following claims be interpreted to embrace all such variations and modifications.

What is claimed is:

1. A stator of an electric motor, the stator comprising:
a plurality of metallic laminations, each lamination comprising a plurality of teeth projecting inward, and wherein adjacent teeth on each individual lamination alternate between a short tooth length and a long tooth length;
said plurality of metallic laminations stacked such that their teeth align to form a plurality of ridges, with slots between the ridges;
wherein tooth lengths of teeth in a first ridge alternate between the long tooth length and the short tooth length, the long tooth length at least approximately 10 thousandths or more longer than a short tooth length.

2. The stator as defined in claim 1 wherein the long tooth length is between approximately 10 thousandths and 30 thousandths longer than the short tooth length.

3. The stator as defined in claim 1 wherein the long tooth length is approximately 20 thousandths longer than the short tooth length.

4. The stator as defined in claim 1 wherein the plurality of laminations are held together, at least in part, by a compressive force of greater than approximately 200 pounds per square inch.

5. A rotor of an electric motor, the rotor comprising:
a plurality of metallic laminations, each lamination comprising a plurality of teeth projecting outward, wherein adjacent teeth on each individual lamination define a slot, and wherein the adjacent teeth alternate between a short tooth height and a long tooth height as measured from a bottom of the slot; and
said plurality of metallic laminations stacked such that their teeth align to form a plurality of ridges;
wherein tooth lengths in a first ridge alternate between the long tooth length and the short tooth length, the long tooth length at least approximately 10 thousandths or more longer than the short tooth length.

6. The rotor as defined in claim 5 wherein the long tooth length is between approximately 10 thousandths and 30 thousandths longer than the short tooth length.

7. The rotor as defined in claim 5 wherein the plurality of laminations are held together, at least in part, by a compressive force of greater than approximately 200 pounds per square inch.

8. An electric motor comprising:
a stator; and
a rotor rotationally mounted within the stator, the rotor comprising
a first and second metallic laminations, each lamination comprising a plurality of teeth projecting outward, wherein adjacent teeth on each of the first and second metallic laminations alternate between a short tooth length and a long tooth length; and
said first and second metallic laminations stacked such that their teeth align to form a plurality of ridges, with slots between the ridges;
wherein a length of a tooth of a first metallic lamination, measured from a center of the first metallic lamination, is longer by at least twice a manufacturing tolerance for length of the each tooth than a length of a tooth of the second metallic lamination, measured from a center of the second metallic lamination, the teeth in the same ridge.

9. The electric motor as defined in claim 8 wherein the tooth of the first lamination is between approximately 10 thousandths and 30 thousandths longer than the tooth of the second lamination.

10. The electric motor as defined in claim 8 wherein the first and second laminations are held together, at least in part, by a compressive force of greater than approximately 200 pounds per square inch.

11. A rotor of an electric motor comprising:
a first lamination comprising a plurality of teeth projecting radially outward;
a second lamination comprising a plurality of teeth projecting radially outward;
a third lamination comprising a plurality of teeth projecting radially outward;
said first, second and third laminations stacked such that their teeth align to form a plurality of ridges, wherein the second lamination abuts the first lamination, and the third lamination abuts the second lamination, and the plurality of ridges define a plurality of slots;
wherein within a particular ridge, a length of a tooth of the first lamination, as measured from a bottom of an adjacent slot, is longer by at least twice a manufacturing tolerance for length of the each tooth than a length of a tooth of the second lamination, as measured from the bottom of the adjacent slot;
wherein the length of a tooth of the third lamination, as measured from the bottom of the adjacent slot, substantially the same as the tooth of the first lamination; and
wherein for each of the first, second and third laminations considered individually, adjacent teeth alternate between a long tooth length and a short tooth length.

* * * * *